US007094460B2

(12) United States Patent
Aylward et al.

(10) Patent No.: US 7,094,460 B2
(45) Date of Patent: *Aug. 22, 2006

(54) IMAGING ELEMENT WITH IMPROVED SURFACE AND STIFFNESS

(75) Inventors: Peter T. Aylward, Hilton, NY (US); Sandra J. Dagan, Churchville, NY (US); Suresh Sunderrajan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 40 days.

This patent is subject to a terminal disclaimer.

(21) Appl. No.: 10/154,894

(22) Filed: May 24, 2002

(65) Prior Publication Data

US 2003/0219610 A1 Nov. 27, 2003

(51) Int. Cl.

| | |
|---|---|
| ***B32B 7/02*** | (2006.01) |
| ***B32B 27/08*** | (2006.01) |
| ***B32B 27/20*** | (2006.01) |
| ***B32B 27/32*** | (2006.01) |
| ***B32B 27/36*** | (2006.01) |

(52) U.S. Cl. ...................... 428/141; 428/212; 428/213; 428/215; 428/332; 428/315.5; 428/315.9; 428/318.4; 428/319.3; 428/319.7; 428/319.9; 428/343; 428/476.6; 428/480; 428/483; 428/910

(58) Field of Classification Search ................ 428/212, 428/910, 195, 500, 515, 516, 523; 264/288.4, 264/290.2, 289.3, 173.11, 173.12, 173.16

See application file for complete search history.

(56) References Cited

U.S. PATENT DOCUMENTS

| | | | | |
|---|---|---|---|---|
| 4,086,383 | A | 4/1978 | Yamano et al. | |
| 4,144,363 | A * | 3/1979 | Balloni et al. | 427/322 |
| 4,365,044 | A | 12/1982 | Liu | |
| 4,427,833 | A * | 1/1984 | Edwards | 525/240 |
| 4,681,803 | A * | 7/1987 | Liu | 428/348 |
| 4,921,749 | A | 5/1990 | Bossaert et al. | |
| 5,275,854 | A | 1/1994 | Maier et al. | |
| 5,413,660 | A * | 5/1995 | Harvey et al. | 156/243 |
| 5,419,960 | A * | 5/1995 | Touhsaent | 428/331 |
| 5,811,493 | A * | 9/1998 | Kent | 525/92 F |
| 5,851,651 | A | 12/1998 | Chao | |
| 5,866,282 | A | 2/1999 | Bourdelais et al. | |
| 5,888,643 | A | 3/1999 | Aylward et al. | |
| 5,906,888 | A * | 5/1999 | Hart | 428/323 |
| 6,030,742 | A | 2/2000 | Bourdelais et al. | |
| 6,153,367 | A | 11/2000 | Gula et al. | |
| 6,281,290 | B1 | 8/2001 | Klosiewicz | |
| 6,379,787 | B1 * | 4/2002 | Lu | 428/323 |
| 6,762,003 | B1 * | 7/2004 | Sunderrajan et al. | 430/60 |
| 2002/0051867 | A1 * | 5/2002 | Hiraki et al. | 428/195 |

FOREIGN PATENT DOCUMENTS

| | | |
|---|---|---|
| EP | 0 994 385 A1 | 4/2000 |
| JP | 97179241 A | 7/1997 |
| JP | 2000211008 | 8/2000 |

OTHER PUBLICATIONS

Schimtz, Peter et al., "Films." Ullmann's Encyclopedia of Industrial Chemistry, 5th Ed., vol. A11 (1988), pp. 85-95, 108-110.*

Ducey, Michael J., *Synthetic Paper Is Coming Of Age*, Graphics Arts Monthly, Dec. 1999, Cahners Publishing Co.

Schut, J.H., *The New Look In Plastic—It's Paper!*, Plastics Technology, Gardner publications, Inc., NY, Feb. 2000.

P-172 Synthetic Paper Industry Report, p. 3, Business Communications Co., Norwalk CT, Mar. 2001.

* cited by examiner

*Primary Examiner*—Vivian Chen
(74) *Attorney, Agent, or Firm*—Lynne M. Blank

(57) ABSTRACT

The present invention relates to an imaging member comprising an imaging layer and a base wherein said base comprises a polymer sheet having at least one oriented polymer core and adhered thereto at least one unoriented polymer layer. Another embodiment relates to an imaging element comprising an imaging layer and a base, wherein said base comprises an integral polymer sheet having at least one oriented polymer core and at least one unoriented polymer layer. The invention further relates to a process of manufacturing a base for an imaging element comprising the steps of extruding a voided core polymer sheet; orienting said extruded voided core polymer sheet; and extrusion coating said oriented extruded voided core polymer sheet with at least one unoriented polymer layer.

57 Claims, No Drawings

IMAGING ELEMENT WITH IMPROVED SURFACE AND STIFFNESS

CROSS REFERENCE TO RELATED APPLICATIONS

Reference is made to commonly assigned, co-pending U.S. patent application:

Ser. No. 10/154,887 by Sunderrajan et al. filed of even date herewith entitled "Imaging Member With Amorphous Hydrocarbon Resin", the disclosures of which are incorporated herein.

FIELD OF THE INVENTION

This invention relates to imaging media. In a preferred form, it relates to supports for photographic, inkjet, thermal, and electrophotographic media.

BACKGROUND OF THE INVENTION

In order for an imaging print support to be widely accepted by the consumer for imaging applications, it has to meet requirements for preferred basis weight, caliper, stiffness, smoothness, gloss, whiteness, and opacity. Supports with properties outside the typical range for 'imaging media' suffer low consumer acceptance.

In addition to these fundamental requirements, imaging supports are also subject to other specific requirements depending upon the mode of image formation onto the support. For example, in the formation of photographic paper, it is important that the photographic paper be resistant to penetration by liquid processing chemicals. Lack of adequate resistance to liquid penetration will result in poor image quality. In the formation of 'photo-quality' inkjet paper, it is important that the paper is readily wetted by ink and that it exhibits the ability to absorb high concentrations of ink and dry quickly. If the ink is not absorbed quickly, the print will stick together when stacked against subsequent prints and exhibit smudging and uneven print density. It is also important that the print remain dimensionally stable in all dimensions including the thickness or z directional plane. Papers that become nonplanar, or wavy like a potato chip, upon absorption of ink are said to have "cockled". For thermal media, it is important that the support contain a thermally insulative layer in order to maximize the transfer of dye from the donor, which results in a higher color saturation.

It is important, therefore, for an imaging media to simultaneously satisfy several requirements. One commonly used technique in the art for simultaneously satisfying multiple requirements is through the use of composite structures comprising multiple layers wherein each of the layers, either individually or synergistically, serves distinct functions. For example, it is known that a conventional photographic paper comprises a cellulose paper base that has applied thereto a layer of polyolefin resin, typically polyethylene, on each side, which serves to provide waterproofing to the paper and also provides a smooth surface on which the photosensitive layers are formed. In another imaging material as in U.S. Pat. No. 5,866,282, biaxially oriented polyolefin sheets are extrusion laminated to cellulose paper to create a support for silver halide imaging layers. The biaxially oriented sheets described therein have a microvoided layer in combination with coextruded layers that contain white pigments such as $TiO_2$ above and below the microvoided layer. The composite imaging support structure described has been found to be more durable, sharper, and brighter than prior art photographic paper imaging supports that use cast melt extruded polyethylene layers coated on cellulose paper. In U.S. Pat. No. 5,851,651, porous coatings comprising inorganic pigments and anionic, organic binders are blade coated to cellulose paper to create 'photo-quality' inkjet paper.

In all of the above imaging supports, multiple operations are required to manufacture and assemble all of the individual layers. For example, photographic paper typically requires a papermaking operation followed by a polyethylene extrusion coating operation, or as disclosed in U.S. Pat. No. 5,866,282, a paper-making operation is followed by a lamination operation for which the laminates are made in yet another extrusion casting operation. There is a need for imaging supports that can be manufactured in a single in-line manufacturing process while still meeting the stringent features and quality requirements of imaging bases.

It is also well known in the art that traditional imaging bases consist of raw paper base. For example, in typical photographic, approximately 75% of the weight of the photographic paper comprises the raw paper base. Although raw paper base is typically a high modulus, low cost material, there exist significant environmental issues with the paper manufacturing process. There is a need for alternate raw materials and manufacturing processes that are more environmentally friendly. Additionally to minimize environmental impact, it is important to reduce the raw paper base content, where possible, without sacrificing the imaging base features that are valued by the customer, i.e., strength, stiffness, surface properties and the like, of the imaging support.

An important corollary of the above is the ability to recycle photographic paper. Current photographic papers cannot be recycled because they are composites of polyethylene and raw paper base and, as such, cannot be recycled using polymer recovery processes or paper recovery processes. A photographic paper that comprises significantly higher contents of polymer lends itself to recycling using polymer recovery processes.

Existing composite color paper structures are typically subject to curl through the manufacturing, finishing, and processing operations. This curl is primarily due to internal stresses that are built into the various layers of the composite structure during manufacturing and drying operations, as well as during storage operations (core-set curl). Additionally, since the different layers of the composite structure exhibit different susceptibility to humidity, the curl of the imaging base changes as a function of the humidity of its immediate environment. There is a need for an imaging support that minimizes curl sensitivity as a function of humidity, or ideally, does not exhibit curl sensitivity.

The stringent and varied requirements of imaging media, therefore, demand a constant evolution of material and processing technology. The idea of an all polymer "synthetic" paper has been around for years. Use of these synthetic papers has been tried in imaging media with limited success (U.S. Pat. No. 5,275,854.) However, these "papers" traditionally fail to meet imaging needs for a variety of reasons such as weak, plastic-like feel and relatively high cost. Synthetic papers in the past have been 3 to 4 times more expensive than media manufactured from cellulose fiber. Schut, J. H., "*The New Look in Plastic—It's Paper*!", Plastics Technology, Gardner Publications, Inc., New York, N.Y., February 2000. As the technology has improved, costs have dropped such that these papers are now within the current range of fine printing papers. There are still barriers to entry into the imaging arena, however, pertaining to stiffness, opacity, conductivity, and surface roughness. Stiffness tends to be the primary feature where synthetic papers compare poorly to cellulose containing media. P-172 Synthetic Paper Industry Report, pg. 3, Business Communications Co., Inc., Norwalk Conn., March 2001. In order to meet cost requirements, the newly introduced synthetic papers (e.g. Japanese Patent 2000211008) typically are comprised of polyethylenes and polypropylenes. Due to the inherently lower elastic modulus of these materials, the stiffness for a sheet of any given comparable weight is at a significant disadvantage compared to a paper base of approximately the same weight. It is well known that stiffness of an imaging element is a function of the modulus of the various layers of the imaging element, the location of the various layers (particularly in terms of the distance from the bending axis) and the overall caliper of the imaging element. Improvements that can be made to the modulus of the various layers comprising the imaging element can increase the overall bending stiffness of the element thus, in turn, increasing its value as an imaging support.

U.S. patent application Ser. No. 09/723,518 presents a foam core imaging member that has adhered to each side a flange sheet comprising extruded or stretched polyolefin. Although this element exhibits the required stiffness associated with that of an imaging element, there is a problem with this in that the surface roughness of the element, which is a function of the surface roughness of the foam core, is poor. The poor surface roughness is inherent to the foaming process wherein the rate of quenching, chill roller surface, blowing agent concentration, additional additives, and polymer matrix material all play a significant role in foam surface quality. Accordingly, it has limited application as an imaging base.

Organic additives that have the potential to enhance the modulus of oriented polyolefin film are known in the art. The composition of the organic additive, which is typically a hydrocarbon resin, must be such that it exhibits a higher glass transition temperature (Tg) than polypropylene. It must also be compatible with polypropylene. It is believed that the addition of the organic additive increases the Tg of the amorphous polypropylene, leading to a densification of the amorphous phase over time, which leads to increased stress transfer between crystalline regions (also called a pseudo network effect) that, in turn, leads to increasing stiffness. For example, Bossaert et al. in U.S. Pat. No. 4,921,749 claim a polyolefin film comprising a base layer of 70% to 97% polypropylene and 30% to 3% hydrogenated resin. The addition of about 20% hydrogenated resin is shown to result in an increase in modulus of about 10–20%. Klosiewicz, in U.S. Pat. No. 6,281,290 claims a process for producing a master batch for a polypropylene article (film, fiber, sheet, or bottle) comprising a mixture of polypropylene, high density polyethylene and hydrocarbon resin having a ring and ball softening point of at least 70 degrees Centigrade. The addition of low levels of hydrocarbon resin and high density polyethylene (HDPE) are reported to increase the tensile modulus of extrusion cast oriented polypropylene films by 15% to 70%.

Traditional imaging elements derive a predominant fraction of their bending stiffness from the cellulose paper substrate and as such do not require the use of organic stiffening additives. However, in the case of non-cellulose core imaging elements, there is potentially a significant application of such technology if it is shown to be viable for polyolefin elements and for extrusion coating processes. C-S Liu, in U.S. Pat. No. 4,365,044, discloses an extrusion-coatable polypropylene composition comprising a hydrogenated copolymer of vinyl toluene, alpha-methyl styrene, and low density polyethylene. Extrusion coatability at speeds up to about 275 m/minute and good adhesion to cellulose substrates, is claimed. However, such a composition is not suitable for use in an imaging element.

Opacity can also be a limiting factor for many of the available all synthetic materials. Usually these materials can not provide a comparable opacity to cellulose bases unless excessive levels of fillers are used. In some cases up to 40% $CaCO_3$ is used, as described in JP 2000211008, which would undoubtedly cause contamination problems in low pH photofinishing solutions used for photographic applications. Use of an all synthetic base, particularly in silver halide applications, would also require a new method of providing adequate conductivity control throughout the manufacturing process. Since an all polymer support does not conduct electrical charges as well as a cellulose paper containing 4–10% moisture, a new method of static protection would be needed to avoid abrupt static discharges. There are several static problems, such as linting, which occur with synthetic papers in the printing industry. Ducey, Michael J., "*Synthetic Paper is Coming of Age*", Graphics Arts Monthly, December 1999, Cahners Publishing Co. Uncontrolled static buildup and release is a distinct disadvantage for synthetic "papers", particularly if used in photographic media, which comprise a light sensitive emulsion. Fast finishing speeds, up to 600 m/min. make this a serious converting concern as well. Static attraction problems may also result in multiple sheet feed problems.

Coating on polymer films rather than cellulose paper has been known to improve several surface characteristics, such as "orange peel". "Orange peel" arises primarily from the surface non-uniformity of the paper formation, this non-uniformity becomes more noticeable and therefore more objectionable the glossier the surface. As the resin coating layers become thinner, "orange peel" and the natural roughness of the cellulose paper fibers are more apt to become objectionable. While polymer films (including some synthetic papers with low $R_a$ values) would offer advantages for an imaging media on the image side, the lack of roughness on the backside of these papers can cause tremendous transport problems throughout the manufacturing process. The surface roughness measurement is a measure of the maximum allowable roughness expressed in units of micrometers and by use of the symbol $R_a$. For the irregular profile of the backside of photographic materials of this invention, the roughness average, $R_a$, is the sum of the absolute value of the difference of each discrete data point from the average of all the data divided by the total number of points sampled. Too low of a surface roughness $R_a$ can result in telescoped rolls, poor wound roll condition, and poor conveyance through manufacturing and printing equipment (including photofinishing equipment).

Additional process barriers to commercially available synthetic "papers" include the chemical interaction of some of the pigmented top layers to photographic development chemistries, and to aqueous solutions found in inkjet applications.

In a non-imaging application in U.S. Patent Application 2002/0015834, H. Biddiscombe also discusses the use of biaxially oriented polymeric films having a core layer comprising a voided homopolymer with a density of not more than 0.70 g/$cm^3$, and at least one substantially non-voided layer on each surface of the core layer. The disadvantage of this structure for an imaging element is that all layers are stretched biaxially therefore limiting composition and functionality of those layers. This is the same disadvantage apparent for U.S. Pat. No. 6,153,367 (Gula, T., et. al), where there is discussion of an integral biaxially oriented polyolefin polymer sheet with a lower layer having a matte surface. In this patent, "any suitable biaxially oriented polyolefin sheet may be used for the base of the invention. Microvoided biaxially oriented sheets are preferred and are conveniently manufactured by coextrusion of the core and surface layers, followed by biaxial orientation, whereby voids are formed around void-initiating material contained in the core layer." As indicated, this sheet is also coextruded and all layers are stretched simultaneously, limiting composition and functionality of those layers.

PROBLEM TO BE SOLVED BY THE INVENTION

An imaging element having a composite structure is needed where the base contains a reduced amount of raw paper to become effectively recyclable and is optimized to meet stiffness, conductivity, colorimetry, opacity and cost requirements while maintaining a very smooth surface under the image, thereby aiding in gloss improvement and surface uniformity improvement while maintaining a backside roughness needed for conveyance and improving or eliminating "orange peel."

SUMMARY OF THE INVENTION

It is an object of the invention to provide a composite imaging material that overcomes the disadvantages of prior imaging bases and provides an imaging base with enhanced bending stiffness and smoothness. It is also intended that a paper based core, which typically provides the majority of stiffness to an imaging media, not be required to meet desired stiffness levels. It is a further object of this invention to provide a composite imaging material that resists humidity curl. It is another object to provide an imaging member that does not cockle upon ink laydown and absorption. It is another further object to provide an imaging member that can be recycled. It is another further object to provide an imaging element with improved opacity. It is a further object of the invention to provide an imaging element that could be manufactured in one manufacturing process. There is also a need for an imaging base that reduces the amount of raw paper base that is used.

These and other objects of the invention are accomplished by an imaging member comprising an imaging layer and a base wherein said base comprises a polymer sheet having at least one oriented polymer core and adhered thereto at least one unoriented polymer layer. Another embodiment comprises an imaging element comprising an imaging layer and a base, wherein said base comprises an integral polymer sheet having at least one oriented polymer core and at least one unoriented polymer layer. Further, the invention comprises a process of manufacturing a base for an imaging element comprising the steps of extruding a voided core polymer sheet; orienting said extruded voided core polymer sheet; and extrusion coating said oriented extruded voided core polymer sheet with at least one unoriented polymer layer.

ADVANTAGEOUS EFFECT OF THE INVENTION

This invention provides a superior imaging support. Specifically, it provides an imaging support of high stiffness, excellent surface uniformity and smoothness, high opacity, humidity curl resistance, and resistance to cockle. Because the invention is insensitive to moisture it also reduces variation in emulsion sensitometry, a leading cause of variability in silver halide media. It also provides an imaging support that can be effectively recycled.

DETAILED DESCRIPTION OF THE INVENTION

This invention has numerous advantages. The invention provides an imaging element that has a smoother imaging surface compared with traditional imaging supports. It has much less tendency to curl or cockle when exposed to extremes in humidity or ink laydown. The lack of moisture sensitivity significantly lowers manufacturing costs as it eliminates manufacturing waste and inventories associated with tight moisture specifications in the raw base. The element can also be recycled to recover and reuse polyolefin instead of being discarded into landfills.

The imaging member of the invention comprises at least one layer of an oriented polymer core structure that has adhered thereto at least one unoriented polymer layer, with the preferred embodiment having an upper and a lower unoriented polymer layer subsequently to be called a "flange" layer. It is an objective of this invention to use a polymer sheet at the core of the imaging base, with flange layers of higher modulus than the core polymer sheet, that provide the needed stiffness by surrounding the core on either side. The high modulus flange layers may, in turn, comprise organic stiffness enhancing materials. Using this approach, many new features of the imaging base may be exploited and restrictions in manufacturing eliminated. These and other advantages will be apparent from the detailed description below.

Typically, the stiffness of any imaging media is provided primarily from the paper base core. Stiffness or flexural rigidity (EI) of an element is a product of the elastic modulus (E) and moment of inertia (I) of the element. Pulp and Paper Manufacture, Volume 7, Paper Machine Operations, Published by the Joint Textbook Committee of the Paper Industry. Atlanta, Ga., 1991 page 10. Moments of inertia are defined by the geometry of the element and are a function, for web layers, of the caliper cubed. In the case of a multi-layer element, stiffness is a function of the individual layer elastic modulus, individual moments of inertias and distances from the neutral axis. Because paper tends to have an extremely high modulus (typically 500,000 to 1,200,000 psi (3447 MPa to 8273.7 MPa) machine direction) compared to polyolefins (eg. low density polyethylene is <30,000 psi (207 MPa)) the paper functions as the primary control mechanism of stiffness in typical imaging medias. 'Polymer Handbook', 3rd Edition, Ed. J. Brandrup and E. H. Immergut, John Wiley and Sons, New York, 1989. Chap. V, Pg. 23, Table 3. However, use of high modulus unoriented flange layers, at a prescribed distance from the neutral axis as described in the invention below, allow the same degree of stiffness control without the need for a paper core. High modulus materials, for the purpose of the present invention, are materials having a modulus greater than 100,000 psi or 689.5 MPa. Increasing the distance of the high modulus layers from the neutral axis increases their affect on and further enhances stiffness. Use of the high modulus flange layers allow a low modulus polymer core layer to be utilized, which is non-paper based or substantially free of paper as conventionally used. Because paper is no longer required, the element can also be easily recycled to recover and reuse the polyolefin instead of being discarded into landfills.

Oriented Polymer Core Layer Materials

The oriented polymer core comprises a homopolymer such as a polyolefin, polyester, polyvinylchloride or other typical thermoplastic polymers and their copolymers or their blends thereof It is intended that the core material be non-paper based. Suitable polyolefins for the oriented core material include polypropylene, polyethylene, polymethylpentene, polystyrene, polybutylene, and mixtures thereof. Polyolefin copolymers, including copolymers of propylene and ethylene such as hexene, butene, and octene are also useful. Polypropylene is preferred, as it is low in cost and has desirable strength properties. Other solid phases may be present in the core layer also, in the form of fillers that are of organic (polymeric, fibrous) origin, such as crosslinked microbeads or immiscible polyethylene terephthalate (PET) and polypropylene (PP) blends, or inorganic (glass, ceramic, metal) origin, such as CaCO3. While some of the fillers may be organic, it is intended that paper fibers not be necessary as a filler to meet the imaging element stiffness requirements. The fillers may be used for physical, optical (lightness, whiteness, and opacity), chemical, or processing property enhancements. Manufacture of the core structure could be accomplished through blown film or cast extrusion processes that were later followed by a stretching of the layer in either an uniaxial or biaxial direction. Various fillers could be used to provide differing levels of voiding and thus density and opacity variations.

In one preferred embodiment of the invention, at least one of the oriented core layers may be voided. “Void” is used herein to mean devoid of added solid and liquid matter, although it is likely the “voids” contain gas. The void-initiating particles, which remain in the finished core should be from 0.1 to 10 μm in diameter, preferably round in shape, to produce voids of the desired shape and size. The size of the void is also dependent on the degree of orientation in the machine and transverse directions. Ideally, the void would assume a shape, which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells and, thus, there is virtually no path open from one side of the voided-core to the other side through which gas or liquid can traverse.

The void-initiating material may be selected from a variety of materials, and should be present in an amount of about 5–50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)═$CH_2$, wherein Ar represents an aromatic hydrocarbon radical, or an aromatic halohydrocarbon radical of the benzene series and R is hydrogen or the methyl radical, acrylate-type monomers include monomers of the formula $CH_2$═C(R')—C(O)(OR) wherein R is selected from the group consisting of hydrogen and an alkyl radical containing from about 1 to 12 carbon atoms and R' is selected from the group consisting of hydrogen and methyl, copolymers of vinyl chloride and vinylidene chloride, acrylonitrile and vinyl chloride, vinyl bromide, vinyl esters having formula $CH_2$═CH(O)COR, wherein R is an alkyl radical containing from 2 to 18 carbon atoms, acrylic acid, methacrylic acid, itaconic acid, citraconic acid, maleic acid, fumaric acid, oleic acid, vinylbenzoic acid, the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene and the like. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization and limited coalescence directly yield very uniformly sized particles.

The void-initiating materials may be coated with an agent to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension are preferred. As the agent, colloidal silica is preferred.

The void-initiating particles can also be inorganic spheres, including solid or hollow glass spheres, metal or ceramic beads, or inorganic particles such as clay, talc, barium sulfate, and calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin film is utilized.

In a preferred embodiment of this invention polyolefins, such as polyethylene and polypropylene, their blends and their copolymers are used as the matrix polymer in the core along with CaCO3 that can act as a voiding and or opacifying agent.

Unoriented "Flange" Layer Materials

The imaging element of this invention has at least one unoriented polymer layer adhered to the oriented polymer core layer previously discussed. The unoriented layers of the composite sheet can be made of the same polymeric materials as listed above for the oriented core matrix. The composite sheet can be made with unoriented layers of the same polymeric material as the core matrix, or it can be made with unoriented layers of different polymeric composition than the core matrix.

In a preferred extrusion coating embodiment of this invention, the unoriented layer (previously referred to as a flange layer) comprise high modulus extrusion-coatable polymer compositions such as high density polyethylene, polypropylene, polyester or polystyrene, their blends or their copolymers with other polymers such as low density polyethylene, branched polypropylene, which may improve their extrusion coatability. It may be necessary to use other additives for improved coatability, opacity, stiffness through modulus modification, and smoothness. Additives might also include such materials as antioxidants, slip agents, or lubricants, and light stabilizers. These additives are added to improve, among other things, the dispersibility of fillers and/or colorants, as well as the thermal and color stability during processing and the manufacturability and the longevity of the finished article. For example, the coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, and the like, heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate, light stabilizers such as hindered amine light stabilizers (HALS), of which a preferred example is poly {[6-[(1,1,3,3-tetramethylbutylamino}-1,3,5-triazine-4-piperidinyl)-imino]-1,6-hexanediyl[{2,2,6,6-tetramethyl-4-piperdinyl) imino]}(Chimassorb® 944 LD/FL).

Optical properties, such as opacity and colorimetry, may be met by the appropriate use of filler materials, such as titanium dioxide and calcium carbonate, and colorants, dyes and/or optical brighteners or other additives known to those skilled in the art. High opacity imaging media (opacity greater than) is preferred by the consumer as it minimizes "show through" from one print to the next and also minimizes the "show through" from any backside logo or printing. The fillers may be in the unoriented flange or an overcoat layer, such as polyethylene. Generally, base materials for color print imaging materials are white, possibly with a blue tint, as a slight blue is preferred to form a "preferred look" for whites in an image. Although whites may have slightly differing tint aims depending on the imaging technology being applied, in almost all cases, a high L* is required by the consumer. L* greater than 94 are desired so that white objects in the final image, such as wedding dresses and snow, do not have a grey cast. L* greater than 99 is difficult and costly to achieve. Any suitable white pigment may be incorporated in the polymer layer such as, for example, titanium dioxide zinc oxide, zinc sulfide, zirconium dioxide, white lead, lead sulfate, lead chloride, lead aluminate, lead phthalate, antimony trioxide, white bismuth, tin oxide, white manganese, white tungsten, calcium carbonate, barium sulfate, or alkaline metal silicates, such as talc, mica, and clays, and combinations thereof The pigment is used in any form that is conveniently dispersed within the flange or resin coat layers. The preferred pigment is titanium dioxide. In addition, suitable optical brightener may be employed in the polyolefin layer including those described in *Research Disclosure*, Vol. No. 308, December 1989, Publication 308119, Paragraph V, page 998.

In a preferred embodiment of this invention, this unoriented polymer structure may have at least one nonvoided layer. As indicated previously, these unoriented polymer layers may contain filler materials, but the fillers are primarily used for optical or smoothing properties or to enhance stiffness rather than for voiding as seen in the oriented core layer. Fillers used as stiffening agents can be inorganic or organic. Some of the commonly used inorganic filler materials are talc, clays, calcium carbonate, magnesium carbonate, barium sulfate, mica, aluminum hydroxide (trihydrate), wollastonite, glass fibers and spheres, silica, various silicates, and carbon black. Some of the organic fillers used are wood flour, jute fibers, sisal fibers, polyester fibers, and the like. The preferred fillers that also act as stiffening agents by enhancing the modulus are talc, mica, and calcium carbonate. Another key additive to extrusion coatable compositions to enhance physical properties such as modulus and stiffness of the imaging element is a low molecular weight substantially amorphous resin or rosin additive. The low molecular weight resin or rosin additive, preferably hydrogenated, has a number average molecular weight below that of the polyolefin to which it is added. The additive resin or rosin may be natural or it may be synthetic. Examples of suitable resins are amorphous petroleum hydrocarbons, coal or petroleum derivatives, substituted hydrocarbons or hydrocarbon derivatives such as polyterpene resins, rosins, rosin derivatives, and styrene resins. These materials may be characterized using the Ring and Ball softening point test and typically have a softening temperature in the range from about 30 degrees Centigrade to about 200 degrees Centigrade, and more typically in the range from about 70 degrees Centigrade to about 180 degrees Centigrade. The additive resin must exhibit a higher glass transition temperature (Tg) than the matrix polymer and must be, at least to a limited extent, compatible with the matrix polymer. For example, if the matrix polymer is polypropylene, then the additive resin must have a higher glass transition temperature than polypropylene. It must also be compatible with polypropylene. Compatibility with the matrix polymer may be manipulated by reducing the average molecular weight of the resin additive or by functionalizing the resin additive. For example, the resin additive may be functionalized with a polar functional group for use with a polar matrix polymer. The resin additive is typically added from about 2% concentration by weight to about 50% concentration by weight. Preferably, it is added from about 10% concentration by weight to about 20% concentration by weight. At an addition level of less than 2%, there is little change in the desired modulus. At addition levels greater than about 50%, processability becomes a concern due to poor chill roll release. Examples of resin additives include, but are not limited to, master batched materials, for example, cyclopentadiene derivatives master batched with polypropylene such as PA®-609 made by Exxon Mobil, or pure monomer hydrocarbon resins master batched with a polyolefin such as Plastolyn® P2539 made by Eastman Chemical Co. Physical blends of hydrogenated hydrocarbon resins and polymer such as Res® P2567, partially hydrogenated aliphatic hydrocarbon resins such as Res® A2661, or fully hydrogenated aliphatic hydrocarbon resins such as the Regalite® R1125 or Regalite® V3140, or hydrogenated pure aromatic resins such as Regalrez® 1139, or polyterpenes such as Piccolyte® C135.

Choice of Core and Flange Properties

The flange layers of this invention are chosen to satisfy specific requirements of flexural modulus, caliper, surface roughness, and optical properties such as colorimetry and opacity. The flange members may be extrusion or adhesive coated.

Imaging elements are constrained to a range in stiffness and caliper. At stiffness below a certain minimum stiffness, there is a problem with the element in print stackability and print conveyance during transport through photofinishing equipment, particularly high speed photoprocessors. It is believed that there is a minimum cross direction stiffness of 60 mN required for effective transport through silver halide photofinishing equipment. At stiffness above a certain maximum, there is a problem with the element in cutting, punching, slitting, and chopping during transport through photofinishing equipment. It is believed that there is a maximum machine direction stiffness of 300 mN for effective transport through photofinishing and inkjet equipment.

Imaging elements are typically constrained by consumer preference and present imaging equipment restrictions (inkjet as well as silver halide) to a stiffness range of between approximately 50 mN and 300 mN. In the design of the element of the invention, there exists a relationship between stiffness of the imaging element and the caliper and modulus of the core and modulus of the flange sheets, i.e., for a given core thickness, the stiffness of the element can be altered by changing the caliper of the flange elements and/or changing the modulus of the flange elements and/or changing the modulus of the core.

If the target overall stiffness and caliper of the imaging element are specified then for a given core thickness and core material, the target caliper and modulus of the flange elements are implicitly constrained. Conversely, given a target stiffness and caliper of the imaging element for a given caliper and modulus of the flange sheets, the core thickness and core modulus are implicitly constrained.

Core Specifications:

The suitable range in caliper of the core is from 50 to 305 μm. The preferred caliper range is between 50 μm and 200 μm because of the preferred overall caliper range of the element, which lies between 100 μm and 400 μm. Below 100 μm consumers do not perceive “photo quality feel” and above 400 μm there is limited consumer perceived added value.

The density (specific gravity) of the core, expressed in terms of “percent of solid density”, is calculated as follows:

$$\frac{\text{Composite Sheet Density}}{\text{Polymer Density}} \times 100 = \% \text{ of Solid Density}$$

The density of the core should be from 0.45 to 1.3 g/cc. The preferred range in density is between 0.5 to 0.80 g/cc. This is because it is difficult to manufacture a uniform product with very low density less than 0.45 g/cc. It is also not economical to manufacture an all synthetic product with density greater than 0.80 g/cc.

Preferred ranges of flange caliper, and core and flange modulus follow. The caliper of the flange sheets of the invention ranges between 10 μm and 175 μm, the modulus of the core of the invention ranges between 30 MPa and 1000 MPa, and the modulus of the flange sheets of the invention ranges from 700 MPa to 10500 MPa. In each case, the above range is preferred because of (a) consumer preference, (b) manufacturability, and (c) materials selection. It is noted that the final choice of flange and core materials, modulus, and caliper will be a subject of the target overall element stiffness and caliper.

The selection of core material, the extent of density reduction and the use of any additives/treatments determine the core modulus. The selection of flange materials and treatments (for example, the use of inorganic fillers such as talc for polymeric flange materials) determines the flange modulus. For example, at the low end of target stiffness (50 mN) and caliper (100 μm), given a typical polyolefin of caliper 50 μm and modulus 137.9 MPa, the flange sheet caliper is then constrained to 25 μm on each side of the core, and the flange modulus required is 10343 MPa. Also, for example, at the high end of target stiffness (250 mN) and caliper (400 μm), given a typical polyolefin core of caliper 300 μm and modulus 137.9 MPa, the flange sheet caliper is constrained to 50 μm on each side and the flange modulus required is 1034 MPa. It is seen from the above explanation that the higher the modulus of the flange layers, the lower the necessary caliper to achieve a targeted stiffness.

In addition to the stiffness and caliper, an imaging element needs to meet constraints in surface smoothness and optical properties such as opacity and colorimetry. Surface smoothness characteristics may be met during flange-sheet manufacturing operations such as during the manufacture of oriented polymers like oriented polystyrene. For the paper of this invention, long wavelength surface roughness or orange peel is of interest. For the irregular surface profile of the paper of this invention, a 0.95 cm diameter probe is used to measure the surface roughness of the paper and, thus, bridges all fine roughness detail. The preferred surface roughness of the element is between 0.05 and 0.44 μm. At surface roughness greater than 0.44 μm, little improvement in image quality or “orange peel” is observed when compared to current photographic papers. A polymer sheet surface roughness less than 0.05 μm is difficult to manufacture and costly. Because the image side surface and transport surfaces are relatively independent of each other, each surface may be designed to fit the respective need. Alternatively, the surface requirements may be met by extrusion coating additional layer(s) of polymers such as polyethylene onto the flange sheets in contact with a textured chill-roll or similar technique known by those skilled in the art. The nonimage side should have a surface roughness average ($R_a$) greater than 0.30 μm to ensure efficient transport through the many types of photofinishing equipment that have been purchased and installed around the world. At surface roughness less that 0.30 μm, transport through the photofinishing equipment becomes less efficient. At surface roughness greater than 2.54 μm, the surface would become too rough causing transport problems in photofinishing equipment, and the rough backside surface would begin to emboss the silver halide emulsion as the material is wound in rolls.

Manufacturing Process:

Any suitable biaxially or uniaxially oriented polyolefin sheet may be utilized for the sheet as the core of the invention. Microvoided composite biaxially oriented sheets are preferred and are conveniently manufactured by coextrusion, followed by biaxial orientation, whereby voids are formed around void-initiating material contained in the core layer. Such composite sheets are disclosed in, for example, U.S. Pat. Nos. 4,377,616, 4,758,462, and 4,632,869, the disclosure of which is incorporated by reference.

The invention, while described as having preferably at least three layers, a reduced density core and a flange layer on each side, may also be provided with additional layers that may serve to change the properties of the oriented sheet. The oriented extrusion could be carried out with as many as 10 layers if desired to achieve some particular desired property. These elements may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability, coating polyvinylidene chloride for heat seal properties. Further examples include flame, plasma, or corona discharge treatment to improve printability or adhesion. The unoriented structure may also have more than one layer, other layers may be added to provide feature. For example current light sensitive silver halide gelatin coatings have been optimized to adhere to polyethylene. Therefore it may be advantageous to coextrude a polyethylene "skin" layer as part of the unoriented "flange" layer that will be immediately under the light sensitive emulsion.

Unoriented "flange" layers could be added through adhesive or extrusion lamination. In a preferred extrusion coating embodiment of this invention, the flange members are coated onto the reduced density base through an extrusion coating operation in contact with a textured chill-roll or similar technique known by those skilled in the art.

In a preferred embodiment of the manufacturing method, the manufacturing process would be reduced to one manufacturing process whereby the core would be cast extruded, biaxially stretched, voided and extrusion coated with the previously discussed flange layers. This would allow waste material to be easily recycled into the core. This would offer the consumer a "greener" and environmental friendlier product as less manufacturing waste would be discarded into landfills. This would also assist in reducing product inventories and would allow sizing of the manufacturing facility to fit the area need. It would also minimize inefficient width uses of base and coating machines.

A typical imaging element also requires an auxiliary or antistatic layer for charge dissipation during high speed transport in manufacturing, finishing or post-processing applications. The problem of controlling static charge is well known in the field of photography and imaging. The accumulation of charge surfaces leads to the attraction of dirt, which can produce physical defects. The discharge of accumulated charge during or after the application of a light sensitive photography emulsion layer(s) can produce irregular fog patterns or "static marks" in the emulsion. The static problems have been aggravated by increase in the sensitivity of new emulsions, increase in coating machine speeds, and increase in post-coating drying efficiency. The charge generated during the coating process may accumulate during winding and unwinding operations, during transport through the coating machines and during finishing operations such as slitting and spooling.

It is generally known that electrostatic charge can be dissipated effectively by incorporating one or more electrically conductive "antistatic" layers into the imaging member. Antistatic layers can be applied to one or to both sides of the imaging member as subbing layers either beneath or on the side opposite to the light-sensitive silver halide emulsion layers. An antistatic layer can be applied as an outer coated layer either over the emulsion layers or on the side of the imaging member base opposite to the light sensitive emulsion layers or both. For some applications, the antistatic agent can be incorporated into the emulsion layers. Alternatively, the antistatic agent can be directly incorporated into the imaging member base itself. Imaging elements with electrical resistivity greater than $10^{12}$ ohms/sq. are prone to static marking for silver halide imaging systems. Furthermore, they are prone to static cling that can cause multiple sheet feeds. Electrical resistivities of less than $10^{12}$ ohms/sq. are required to prevent the silver halide fogging due to electrical discharge and to prevent excessive static charge build-up during high speed conveyance and winding which can negatively affect transport and wound roll quality.

A wide variety of electrically conductive materials can be incorporated into antistatic layers to produce a wide range of conductivities. These can be divided into two broad groups: (i) ionic conductors and (ii) electronic conductors. In ionic conductors charge is transferred by the bulk diffusion of charged species through an electrolyte. Here the resistivity of the antistatic layer is dependent on temperature and humidity. Antistatic layers containing simple inorganic salts, alkali metal salts of surfactants, ionic conductive polymers, polymeric electrolytes containing alkali metal salts, and colloidal metal oxide sols (stabilized by metal salts), described previously in patent literature, fall in this category. However, many of the inorganic salts, polymeric electrolytes, and low molecular weight surfactants used are water-soluble and are leached out of the antistatic layers during processing, resulting in a loss of antistatic function. The conductivity of antistatic layers employing an electronic conductor depends on electronic mobility rather than ionic mobility and is independent of humidity. Antistatic layers which contain conjugated polymers, semiconductive metal halide salts, semiconductive metal oxide particles. However, these antistatic layers typically contain a high volume percentage of electronically conducting materials which are often expensive and impart unfavorable physical characteristics, such as color, increased brittleness and poor adhesion, to the antistatic layer.

Besides antistatic properties, an auxiliary layer in a photographic element maybe required to fulfill additional criteria depending on the application. For example for resin-coated photographic paper, the antistatic layer if present as an external backing layer should be able to receive prints (e.g., bar codes or other indicia containing useful information) typically administered by dot matrix printers and to retain these prints or markings as the paper undergoes processing. Most colloidal silica based antistatic backings, without a polymeric binder, provide poor post-processing backmark retention qualities for photographic paper. Typical antistat used in this application include a conductive agent comprises alkali metal salts of polyacids or cellulose derivatives. Other conductive agent comprises polymerized alkylene oxides and alkali metal salts.

For example, an antistatic layer comprising an alkali metal salt of a copolymer of styrene and styrylundecanoic acid is disclosed in U.S. Pat. No. 3,033,679. Photographic films having a metal halide, such as sodium chloride or potassium chloride, as the conducting material, in a hardened polyvinyl alcohol binder are described in U.S. Pat. No. 3,437,484. In U.S. Pat. No. 3,525,621, the antistatic layer is comprised of colloidal silica and an organic antistatic agent, such as an alkali metal salt of an alkylaryl polyether sulfonate, an alkali metal salt of an arylsulfonic acid, or an alkali metal salt of a polymeric carboxylic acid. An antistatic layer comprised of an anionic film forming polyelectrolyte, colloidal silica and a polyalkylene oxide is disclosed in U.S. Pat. No. 3,630,740. In U.S. Pat. No. 3,681,070, an antistatic layer is described in which the antistatic agent is a copolymer of styrene and styrene sulfonic acid. U.S. Pat. No. 4,542,095 describes antistatic compositions comprising a binder, a nonionic surface-active polymer having polymerized alkylene oxide monomers and an alkali metal salt. In U.S. Pat. No. 4,916,011, an antistatic layer comprising a styrene sulfonate-maleic acid copolymer, a latex binder, and an alkyl-substituted trifunctional aziridine crosslinking agent is disclosed. An antistatic layer comprising a vanadium pentoxide colloidal gel is described in U.S. Pat. No. 4,203,769. U.S. Pat. Nos. 4,237,194, 4,308,332, and 4,526,706 describe antistats based on polyaniline salt-containing layers. Crosslinked vinylbenzyl quaternary ammonium polymer antistatic layers are described in U.S. Pat. No. 4,070,189.

Used herein, the phrase ‘imaging element’ comprises an imaging support as described above along with an image receiving layer as applicable to multiple techniques governing the transfer of an image onto the imaging element. Such techniques include thermal dye transfer, electrophotographic printing, such as xerographic and thermographic, or ink jet printing, as well as a support for photographic silver halide images. As used herein, the phrase “photographic element” is a material that utilizes photosensitive silver halide in the formation of images.

The thermal dye image-receiving layer of the receiving elements used with the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount that is effective for the intended purpose. In general, good results have been obtained at a concentration of from about 1 to about 10 g/$m^2$. An overcoat layer may be further coated over the dye-receiving layer, such as described in U.S. Pat. No. 4,775,657 of Harrison et al.

Dye-donor elements that are used with the dye-receiving element conventionally comprise a support having thereon a dye containing layer. Any dye can be used in the dye-donor employed with the invention, provided it is transferable to the dye-receiving layer by the action of heat. Especially good results have been obtained with sublimable dyes. Dye donors applicable for use with the present invention are described, e.g., in U.S. Pat. Nos. 4,916,112, 4,927,803, and 5,023,228. As noted above, dye-donor elements are used to form a dye transfer image. Such a process comprises imagewise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads, which can be used to transfer dye from dye-donor elements to receiving elements, are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps, the use of liquid toners in place of dry toners is simply one of those variations.

The first basic step, creation of an electrostatic image, can be accomplished by a variety of methods. In one form, the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

When used as inkjet imaging media, the recording elements or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, can be applied to the surface of the support. The ink receiving layer is preferably coated onto the support layer from water or water-alcohol solutions at a dry thickness ranging from 3 to 75 micrometers, preferably 8 to 50 micrometers.

Any known inkjet receiver layer can be used with the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, and the like, derivatives of natural polymers such as functionalized proteins, functionalized gums and starches, and cellulose ethers and their derivatives, and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers, and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is preferred for the base layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer can be overcoated with an ink-permeable, anti-tack protective layer such as, for example, a layer comprising a cellulose derivative or a cationically-modified cellulose derivative or mixtures thereof. An especially preferred overcoat is poly β-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water-based inks. The overcoat layer can also protect the ink receiving layer from abrasion, smudging, and water damage. In general, this overcoat layer may be present at a dry thickness of about 0.1 to about 5 μm, preferably about 0.25 to about 3 μm.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, light stabilizers, and the like. In addition, a mordant may be added in small quantities (2%–10% by weight of the base layer) to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, curtain coating, and the like. Some of these methods allow for simultaneous coatings of both layers, which is preferred from a manufacturing economic perspective.

The DRL (dye receiving layer) is coated over the tie layer or TL at a thickness ranging from 0.1–10 μm, preferably 0.5–5 μm. There are many known formulations, which may be useful as dye receiving layers. The primary requirement is that the DRL is compatible with the inks, which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166, 5,264,275, 5,104,730, 4,879,166, and Japanese Patents 1,095,091, 2,276,671, 2,276,670, 4,267,180, 5,024,335, and 5,016,517 disclose aqueous based DRL formulations comprising mixtures of psuedo-bohemite and certain water soluble resins. Light in U.S. Pat. Nos. 4,903,040, 4,930,041, 5,084,338, 5,126,194, 5,126,195, and 5,147,717 discloses aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based DRL formulations comprising vinyl copolymers, which are subsequently cross-linked. In addition to these examples, there may be other known or contemplated DRL formulations, which are consistent with the aforementioned primary and secondary requirements of the DRL.

The preferred DRL is 0.1–10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118, 5,027,131, and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements used with the present invention are water-based, such as those currently sold for use in the Hewlett-Packard Desk Writer® 560C printer. However, it is intended that alternative embodiments of the image-recording elements as described above, which may be formulated for use with inks which are specific to a given ink-recording process or to a given commercial vendor.

In one preferred embodiment, in order to produce photographic elements, the composite support sheet is coated with a photographic element or elements. The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful with this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea, reducing agents, e.g., polyamines and stannous salts, noble metal compounds, e.g., gold, platinum, and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized with this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride, and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements used in the invention may utilize emulsions as described in The Theory of the Photographic Process, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals, which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives, tin compounds, polyamine compounds, and thiourea dioxide-based compounds described in U.S. Pat. Nos. 2,487,850, 2,512,925, and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements used with this invention may use emulsions doped with Group VII metals such as iridium, rhodium, osmium, and iron as described in Research Disclosure, September 1994, Item 36544, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element comprises the invention laminated support bearing a cyan dye image-forming unit comprising at least one red-sensitive silver halide emulsion layer having associated therewith at least one cyan dye-forming coupler, a magenta image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 μm. The invention may be utilized with the materials disclosed in Research Disclosure, September 1997, Item 40145. The invention is particularly suitable for use with the material color paper examples of sections XVI and XVII. The couplers of section II are also particularly suitable. The Magenta I couplers of section II, particularly M-7, M-10, M-18, and M-18, set forth below are particularly desirable. In the following Table, reference will be made to (1) Research Disclosure, December 1978, Item 17643, (2) Research Disclosure, December 1989, Item 308119, and (3) Research Disclosure, September 1994, Item 36544, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference Section | Subject Matter |
|---|---|
| 1 | I, II Grain composition, |
| 2 | I, II, IX, X, XI, morphology and preparation. |
| | XII, XIV, XV Emulsion preparation including |
| | I, II, III, IX hardeners, coating aids, |
| 3 | A & B addenda, etc. |
| 1 | III, IV Chemical sensitization and |
| 2 | III, IV spectral sensitization/ |
| 3 | IV, V Desensitization. |
| 1 | V UV dyes, optical brighteners, |
| 2 | V luminescent dyes |
| 3 | VI |
| 1 | VI Antifoggants and stabilizers |
| 2 | VI |
| 3 | VII |
| 1 | VIII Absorbing and scattering |
| 2 | VIII, XIII, XVI materials; Antistatic layers; |
| 3 | VIII, IX C & D matting agents |
| 1 | VII Image-couplers and image- |
| 2 | VII modifying couplers; Dye |
| 3 | X stabilizers and hue modifiers |
| 1 | XVII Supports |
| 2 | XVII |
| 3 | XV |
| 3 | XI Specific layer arrangements |
| 3 | XII, XIII Negative working emulsions; |
| | Direct positive emulsions |
| 2 | XVIII Exposure |
| 3 | XVI |
| I | XIX, XX Chemical processing; |
| 2 | XIX, XX, XXII Developing agents |
| 3 | XVIII, XIX, XX |
| 3 | XIV Scanning and digital |
| | processing procedures |

The photographic elements can be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4®. (Eastman Kodak Company) process or other processing systems suitable for developing high chloride emulsions. This invention is also directed towards a photographic recording element comprising a support and at least one light sensitive silver halide emulsion layer comprising silver halide grains as described above.

In another embodiment, imaging media useful with the present invention that provide a stiff and very smooth white base may be used as an imaged label or sticker print. Application of an adhesive layer by means known to those skilled in the art would provide a means of converting the imaging base into an imaged self-adhesive label or print. The adhesive layer could be permanent or repositionable. The adhesive may be coated or otherwise applied on the oriented core followed by the extrusion of the flange layer over the adhesive or the adhesive could be applied to an extruded flange layer.

A release liner that covers the adhesive could also be added in order to carry the material through necessary imaging processes, such as photofinishing. A release sheet of a tear-resistant polymer would produce a release sheet that would be easily removable. A self-adhesive sticker print or label could be used with any of the previously described imaging technologies including silver halide, inkjet, thermal dye transfer or electrophotography.

The following examples illustrate the practice of this invention. They are not intended to be exhaustive of all possible variations of the invention. Parts and percentages are by weight unless otherwise indicated.

EXAMPLES

Paper base was produced for the examples of this invention using a standard fourdrinier paper machine and a blend of mostly bleached hardwood Kraft fibers. The fiber ratio consisted primarily of bleached poplar (38%) and maple/beech (37%) with lesser amounts of birch (18%) and softwood (7%). Fiber length was reduced from 0.73 mm length weighted average as measured by a Kajaani FS-200 to 0.55 mm length using high levels of conical refining and low levels of disc refining. Fiber Lengths from the slurry were measured using a FS-200® Fiber Length Analyzer (Kajaani Automation Inc.). Paper was made for sample 1 to a 160 $g/m^2$ basis weight and sample 3 to 172 $g/m^2$ weight with acid sizing chemistry, surface sizing using hydroxyethylated starch and sodium chloride was also employed on the control samples but is not critical for the comparison. The paper was then calendered to an apparent density of 1.04 g/cc.

Example 1 and 3

Control

The bases for these examples were prepared by mono-extrusion coating the above cellulosic paper base on both sides using a face side composite comprising substantially 83% low density polyethylene (LDPE), 12.5% titanium dioxide, 3% zinc oxide and 0.5% of calcium stearate and a wire side blend of high density and low density polyethylene at a 46/54 ratio. Resin coverages were approximately 27 $g/m^2$.

Example 2 and 4

The samples prepared for examples 2 and 4 did not use a cellulosic paper base for the core but instead used an extruded polypropylene core layer. Each side of the core was then extrusion coated with a polyolefin flange layer. Table 2 provides material identification, layer composition and coverage for Example 2 and Example 4. Example 2 contains a biaxially oriented polypropylene core material (BOPP), while Example 4 contains a uniaxially or monoaxially oriented polypropylene core material (MOPP). In both cases the face skin and face flange were coextruded onto the face side of the core. The non-image side of the core was also coextrusion coated with a flange layer and a wire skin. Melt temperatures used are listed on the table below. In each case, the flange layers were coated using a 3.5" (0.09 m) extruder and the skin layers were coated using a 2.5" (0.06 m) extruder and a coextrusion feed block adapter at a line speed of 91.4 m/min, an air gap of 21.6 cm, and a die gap cold set at 0.0635 cm.

TABLE 2

Composition of invention examples

| | (demonstration of the invention) Materials | Caliper | Weight |
|---|---|---|---|
| Example 2 Layer | | | |
| Face skin | 60% NA214 Low density PE (Millenium), 22% 4002P (Eastman Chemical 0.917 g/cc (melt temp = 550 F., 287.8 C.) low density polyethylene), 15% Anatase AHR TiO2, 3% ZnO | 0.5 mil | 12.2 g/m2 |
| Face flange | 50% PF611, 20% PA609, 20% Talc, 10% AHR TiO2 (melt temp = 500 F., 287.8 C.) | 1.75 mil | 43.0 g/m2 |
| Core | Low density BOPP polypropylene sheet | 6 mil | |
| Wire flange | 50% PF611, 20% PA609, 20% Talc, 10% AHR TiO2 (melt temp = 500 F., 287.8 C.) | 1.75 mil | 43.0 g/m2 |
| Wire skin | 100% NA214 (melt temp = 550 F., 287.8 C.) | 10.0 mil | |
| Blends Face skin | | | |
| Face flange | 20% PA609 + 50% (compounded Talc-PF611 40% conc) + 25% (compounded TiO2-PF611 40% conc) + 5% PF611 | | |
| Wire flange | 20% PA609 + 50% (compounded Talc-PF611 40% conc) + 25% (compounded TiO2-PF611 40% conc) + 5% PF611 | | |
| Example 4 | | | |
| Face skin | 77.5% 4002P, 18% TiO2, 4.5% ZnO (melt temp = 550 F., 287.8 C.) | 0.5 mil | 12.2 g/m2 |
| Face flange | 50% PF611, 20% PA609, 20% Talc, 10% TiO2 (melt temp = 500 F., 287.8 C.) | 1.75 mil | 43.0 g/m2 |
| Core | Low density MOPP Polypropylene sheet | 6 mil | |
| Wire flange | 50% PF611, 20% PA609, 20% Talc, 10% TiO2 (melt temp = 500 F., 287.8 C.) | 1.75 mil | 43.0 g/m2 |
| Wire skin | 100% NA214 (melt temp = 550 F., 287.8 C.) | 10.0 mil | |
| Blends | | | |
| F/s flange | 20% PA609 + 50% (compounded Talc-PF611 (40% conc)) + 25% (compounded TiO2-PF611 40% conc + 5% PF611 | | |
| W/s flange | 20% PA609 + 50% (compounded Talc-PF611) + 25% (compounded TiO2-PF611) + 5% PF611 | | |

TABLE 3

| Smoothness and Gloss of Invention compared to photographic paper benchmark | | Image Side Orange Peel Ra (micrometers) | Image Side Tri Gloss (air dried) Gardener Gloss units |
|---|---|---|---|
| Sample 3 | (photographic paper comparison) | 0.491 | 60.7 |
| Sample 2 | (demonstration of invention w/BOPP core) | 0.114 | 71.4 |

Table 3 shows the significant advantage in "orange peel" and gloss that sample 2 of the invention has when compared to the sample 3 "photographic paper" benchmark. Gloss was measured at a 20 degree angle using a 4520 Tri gloss meter. The gloss meter is manufactured by (BYK) Gardener and gloss is measured in Gardener gloss units. "Orange peel" on the image side of the imaging element was measured by using a 0.95 cm diameter probe to measure the average surface roughness $R_a$ of the paper and, thus, bridge all fine roughness detail.

TABLE 4

Orange Peel as indicated by Ra values

| | | Ra avg (microns) | Position across web 1 | 2 | 3 | 4 | 5 | 6 | 7 | 8 | 9 | 10 |
|---|---|---|---|---|---|---|---|---|---|---|---|---|
| Sample 3 | (photographic paper comparison) | 0.49 | 0.50 | 0.50 | 0.49 | 0.47 | 0.49 | 0.43 | 0.51 | 0.52 | 0.49 | 0.49 |
| Sample 2 | (demonstration of the invention) | 0.11 | 0.14 | 0.13 | 0.11 | 0.09 | 0.1. | 0.10 | 0.11 | 0.09 | 0.15 | 0.12 |

This difference in orange peel between the samples was consistently apparent when evaluating multiple locations across the web as shown in Table 4.

Sample 5 and 6:

Typical "synthetic paper" samples were purchased at two weights in the approximate weight range of a typical photographic paper support.

Samples are polypropylene films highly filled with mineral fillers and commercially marketed as "Synthetic Paper". Sample 5 is 176 $g/m^2$, while Sample 6 is 204 $g/m^2$

TABLE 5

Stiffness and opacity Comparison at equivalent weights for BOPP core sample

| Sample Identification | Avg. L&W Stiffness mN | Basis Weight G/M² | Caliper microns | Apparent Density g/cc | L & W Stiffness - mN: Machine direction stiffness MN | Cross direction stiffness mN | Image Side Surface Roughness Avg $R_a$ (micrometers) |
|---|---|---|---|---|---|---|---|
| Sample 5 Synthetic "Paper" comparison | 46 | 176 | 151 | 1.17 | 49.9 | 42.2 | .470 |
| Sample 6- Synthetic "Paper" comparison | 70 | 204 | 183 | 1.11 | 74.4 | 65.7 | .363 |
| Sample 1 Photographic paper comparison | 139 | 213 | 204 | 1.04 | 178 | 100 | .472 |
| Sample 2 (demonstration of invention w/ BOPP core) | 142 | 193 | 233 | 0.829 | 136.5 | 147.5 | .258 |

| Sample Identification | UVI L* | UVI a* | UVI b* | UVO L*- | UVO a*- | UVO b*- | Opacity |
|---|---|---|---|---|---|---|---|
| Sample 5 Synthetic Paper | 93.24 | −1.32 | −1.11 | 92.42 | −1.22 | −1.63 | 95 |
| Sample 6 Synthetic Paper | 96.63 | −1.20 | 2.95 | 95.80 | −.72 | 1.37 | 90 |
| Sample 2 (demonstration of invention w/ BOPP core) | 96.90 | 1.05 | −6.00 | 95.56 | −0.19 | −1.11 | 98 |

In Table 5, it can be clearly seen that stiffness equal to or better than the benchmarks was achieved with the imaging element of the invention at approximately comparable weights. Sample 2 demonstrated higher stiffness when compared to traditional all synthetic bases (samples 5 and 6) and when compared to a traditional photographic base (sample 1) at approximately equivalent weight. Stiffness was measured using a Lorentzen and Wetter type tester according to Tappi Method T 556. The bending resistance in milliNewtons of a 20 mm wide vertically clamped sample is measured for a 15° deflection angle.

It was also shown that the imaging element of the invention also provided higher L*uvi values and equal or higher opacity at approximately equivalent weights. Colorimetry was measured on an UltraScan® XE Colorimeter made by Hunter Associates Laboratory using a D 6500 light source without (UVO) UV light excitation of the sample. Opacity was measured according to ASTM method E308-96, specular reflectance was included, and the testing was done by measuring one sheet black by black and then black by white (Baryta).

TABLE 6

Comparison of Orange Peel, Gloss and Stiffness with MOPP core sample

| | Image Side Orange Peel Surface Smoothness $R_a$ micrometers | Image Side Gloss (air dried) Gardener gloss units | L&W Average Stiffness mN |
|---|---|---|---|
| Sample 3A (photographic base comparison) | .48 | 57.4 | 159 |
| Sample 4 (demonstration of invention w/MOPP core) | .28 | 63.7 | 154 |

In the last table, it is apparent that the high stiffness values needed for photographic and other imaging bases can be maintained while still demonstrating significant improvements in orange peel and gloss using an MOPP core. This means that consumers will have an option of smoother and glosser prints without having to give up the "photo" paper quality feel, they have come to prefer.

What is claimed is:

1. An imaging element comprising an imaging layer and a base, wherein said base comprises an integral polymer sheet having an oriented polymer core of insufficient stiffness for an imaging base and at least one unoriented polymer stiffening layer, wherein said unoriented polymer stiffening layer is of a higher modulus than said oriented polymer core.

2. The imaging element of claim 1 wherein said oriented polymer core is voided.

3. The imaging element of claim 1 wherein said unoriented polymer layer is nonvoided.

4. The imaging element of claim 1 wherein said oriented polymer core comprises polyolefin.

5. The imaging element of claim 4 wherein said polyolefin comprises at least one member selected from the group consisting of polypropylene, polyethylene, polypropylene co-polymer derivatives, or polyethylene co-polymer derivatives.

6. The imaging element of claim 1 wherein said oriented polymer core is biaxially oriented.

7. The imaging element of claim 1 wherein said oriented polymer core is uniaxially oriented.

8. The imaging element of claim 1 wherein said integral polymer sheet further comprises white pigment.

9. The imaging element of claim 1 wherein said white pigment is at least one member selected from the group consisting of titanium dioxide, calcium carbonate, zinc sulfide, barium sulfate, or alkaline metal silicates.

10. The imaging element of claim 1 wherein said at least one unoriented polymer layer is melt extruded.

11. The imaging element of claim 1 wherein said at least one unoriented polymer layer is polyolefin.

12. The imaging element of claim 1 wherein said at least one unoriented polymer layer comprises inorganic stiffening agents.

13. The imaging element of claim 12 wherein said inorganic stiffening agents are selected from the group consisting of inorganic metal silicates, carbonates, and glass fiber.

14. The imaging element of claim 1 wherein said at least one unoriented polymer layer comprises organic stiffening agents.

15. The imaging element of claim 14 wherein said organic stiffening agents are selected from the group consisting of amorphous hydrocarbon resins having a softening temperature of greater than 30 degrees Centigrade selected from the group consisting of pure monomer hydrocarbon resins, physical blends of hydrogenated hydrocarbon resins, partially hydrogenated hydrocarbon resins, fully hydrogenated hydrocarbon resins, polyterpenes.

16. The imaging element of claim 1 wherein said at least one unoriented polymer layer further comprises colorants.

17. The imaging element of claim 1 wherein the opacity is greater than 92.

18. The imaging element of claim 1 wherein the L* is 94 to 99.

19. The imaging element of claim 1 wherein the electrical resistivity is less than $10^{12}$ log ohms/sq.

20. The imaging element of claim 1 wherein the stiffness is between 50 and 300 mN.

21. The imaging element of claim 1 wherein the preferred image-side roughness is Ra measurement is between 0.05 and 0.44 micrometers.

22. The imaging element of claim 1 wherein the non-image side roughness is between 0.30 and 2.54 micrometers.

23. The imaging element of claim 1 wherein the preferred image-side roughness is Ra measurement is between 0.05 and 0.44 micrometers and the non-image side roughness is between 0.30 and 2.54 micrometers.

24. The imaging element of claim 1 wherein the caliper is 100 to 400 micrometers.

25. The imaging element of claim 1 wherein the caliper of said at least one oriented polymer core comprises between 50 micrometers and 200 micrometers.

26. The imaging element of claim 1 wherein the caliper of said at least one unoriented polymer layer comprises between 10 micrometers and 175 micrometers.

27. The imaging element of claim 1 wherein the modulus of said oriented polymer core comprises between 30 MPa and 1000 MPa.

28. The imaging element of claim 1 wherein the caliper of said at least one unoriented polymer layer comprises between 700 MPa to 10500 MPa.

29. The imaging element of claim 1 wherein said at least one unoriented polymer layer comprises at least one unoriented polymer layer adjacent the top and bottom of said at least one oriented polymer core.

30. The imaging element of claim 29 wherein said at least one unoriented polymer layer is coextruded.

31. The imaging element of claim 29 wherein said at least one unoriented polymer layer adjacent the top of said at least one oriented polymer core adheres to gelatin.

32. The imaging element of claim 1 wherein said element is a photographic element.

33. The imaging element of claim 1 wherein said element is an inkjet element.

34. The imaging element of claim 1 wherein said element is a electrophotographic element.

35. The imaging element of claim 1 wherein said element is a thermal dye transfer element.

36. The imaging element of claim 1 wherein said base comprising an oriented polymer core and having at least one unoriented polymer layer is recyclable.

37. The imaging element of claim 36 wherein said base is substantially free of paper fiber.

38. The imaging element of claim 36 wherein said base comprises less than 75% by weight of raw paper.

39. The imaging element of claim 36 wherein said base is comprises less than 50% by weight of raw paper.

40. The imaging element of claim 1 further comprising an adhesive layer.

41. An imaging element comprising an imaging layer and a base, wherein said base comprises at least one integral polymer sheet comprising a voided oriented polymer core of insufficient stiffness for an imaging base between at least one nonvoided unoriented polymer upper stiffening layer and at least one nonvoided unoriented polymer lower stiffening layer, wherein said unoriented polymer stiffening layer is of a higher modulus than said oriented polymer core.

42. The imaging element of claim 41 wherein said voided oriented polymer core comprises polyolefin.

43. The imaging element of claim 41 wherein said voided integrally oriented polymer core is biaxially oriented.

44. The imaging element of claim 41 further comprising white pigment.

45. The imaging element of claim 41 wherein said at least one unoriented polymer upper layer and at least one unoriented polymer lower layer are co-extruded.

46. The imaging element of claim 41 wherein said at least one unoriented polymer upper layer is at least one member selected from the group consisting of polypropylene, polyethylene.

47. The imaging element of claim 41 wherein said at least one unoriented polymer upper layer and at least one unoriented polymer lower layer comprise stiffening agents.

48. The imaging element of claim 41 wherein the caliper is 100 to 400 micrometers.

49. The imaging element of claim 41 wherein the caliper of said voided oriented polymer core comprises between 50 micrometers and 200 micrometers.

50. The imaging element of claim 41 wherein the caliper of said at least one unoriented polymer layer comprises between 10 micrometers and 175 micrometers.

51. The imaging element of claim 41 wherein the modulus of said voided oriented polymer core comprises between 30 MPa and 1000 MPa.

52. The imaging element of claim 41 wherein the caliper of said at least one unoriented polymer layer comprises between 700 MPa to 10500 MPa.

53. The imaging element of claim 41 wherein said at least one unoriented polymer upper layer adheres to gelatin.

54. The imaging element of claim 41 wherein said base is recyclable.

55. The imaging support of claim 54 wherein said support is substantially free of paper fiber.

56. The imaging element of claim 41 further comprising an adhesive layer.

57. A process of manufacturing a base for an imaging element comprising the steps of:

a. extruding a voided core polymer sheet of insufficient stiffness for an imaging base;

b. orienting said extruded voided core polymer sheet; and c. extrusion coating said oriented extruded voided core polymer sheet with at least one unoriented polymer stiffening layer, wherein said unoriented polymer stiffening layer is of a higher modulus than said oriented polymer core.

* * * * *

UNITED STATES PATENT AND TRADEMARK OFFICE

CERTIFICATE OF CORRECTION

PATENT NO. : 7,094,460 B2 Page 1 of 1
APPLICATION NO. : 10/154894
DATED : August 22, 2006
INVENTOR(S) : Peter T. Aylward et al.

It is certified that error appears in the above-identified patent and that said Letters Patent is hereby corrected as shown below:

Column 29, line 9-10, Claim 29 delete “at least one”
Column 29, line 31, Claim 39 delete “is”

Signed and Sealed this

Fourth Day of September, 2007

JON W. DUDAS
*Director of the United States Patent and Trademark Office*